United States Patent [19]
Suttner

[11] Patent Number: 5,684,345
[45] Date of Patent: Nov. 4, 1997

[54] SINGLE PHASE INDUCTION MOTOR AS THE DRIVE OF A HIGH PRESSURE CLEANING DEVICE

[75] Inventor: Wolfgang Suttner, Bielefeld, Germany

[73] Assignee: Elektra Beckum AG, Meppen, Germany

[21] Appl. No.: 572,075

[22] Filed: Dec. 14, 1995

[30] Foreign Application Priority Data

Dec. 16, 1994 [DE] Germany .......................... 44 45 031.1

[51] Int. Cl.⁶ .......................... H02K 17/04; H02K 7/118; B08B 3/02
[52] U.S. Cl. .......................... 310/41; 310/100; 310/75 B; 200/543; 417/374
[58] Field of Search .......................... 310/41, 100, 75 B, 310/272, 273; 318/136, 446; 417/374; 123/185.2, 185.3, 185.6; 74/512; 200/543, 544, 545, 546

[56] References Cited

U.S. PATENT DOCUMENTS

| | | | |
|---|---|---|---|
| 727,411 | 5/1903 | McBerty | 310/41 |
| 968,934 | 8/1910 | Goughnour | 310/41 |
| 1,010,835 | 12/1911 | Whalton | 310/41 |
| 1,284,219 | 11/1918 | Benjamin | 310/41 |
| 1,388,452 | 8/1921 | Cuno | 200/545 |
| 1,968,804 | 7/1934 | Arden | 310/41 |
| 2,027,944 | 11/1936 | Whitehead et al. | 310/41 |
| 2,226,697 | 12/1940 | Dalkowitz | 310/41 |
| 2,502,048 | 3/1950 | Kahn . | |
| 2,596,512 | 4/1952 | Thomas | 123/185.3 |
| 2,825,924 | 3/1958 | Humphrey | 200/545 |
| 3,783,216 | 1/1974 | Plamper et al. | 200/545 |
| 4,114,583 | 9/1978 | Sleder et al. | 310/70 A |
| 4,740,733 | 4/1988 | Epars | 310/41 |
| 5,267,540 | 12/1993 | Zerrer et al. | 123/185.3 |

FOREIGN PATENT DOCUMENTS

9302945 U 12/1993 Germany .

Primary Examiner—Thomas M. Dougherty
Assistant Examiner—B. Mullins
Attorney, Agent, or Firm—Sixbey, Friedman, Leedom & Ferguson; David S. Safran

[57] ABSTRACT

A single phase induction motor for driving a high pressure cleaning device. The induction motor has a stator (1) with a drive shaft (2) and a rotor (4) which is located on the shaft (2). High pressure pump (3) of the high pressure cleaning device is driven by the shaft (2). A muscle-powered starting aid (5, 18) is used to activate an on-off switch (11) of the single phase induction motor. Alternatively, the on-off switch (11) can be activated independently of the starting aid (5, 18) or via an electrical starting aid (B). In accordance with preferred embodiments, the muscle-powered starting aid can be a rope pull starter (5) or a kickstarter (18) and may act directly on the shaft (2) or via a transmission.

6 Claims, 3 Drawing Sheets

SINGLE PHASE INDUCTION MOTOR AS THE DRIVE OF A HIGH PRESSURE CLEANING DEVICE

BACKGROUND OF THE INVENTION

1. Field of the Invention

The invention relates to a single phase induction motor for use as the drive of a high pressure cleaning device.

2. Description of Related Art

Single phase induction motors, due to their simple structure, are widely used in the power range up to roughly 1 kW. This type of electric motor can dispense with a supply lead to the rotor, so that fault-susceptible slip rings and brushes, which are necessary in other types of electric motors, are entirely eliminated. The simplicity and popularity of the single phase induction motor result in the fact that it can be manufactured in a very price-favorable manner.

One problem of the single phase induction motor is its starting behavior. Various measures are known for improving the starting behavior of single phase induction motors.

In single phase induction motors having an auxiliary phase and capacitor, an auxiliary winding is series-connected to the capacitor. With the capacitor continually connected, this single phase induction motor is suitable for driving machines which are easy to start. The starting moment at roughly twice the nominal current is from 30 to 50% of the nominal moment. In this measure, it is problematic that, for a motor running unloaded, the auxiliary winding becomes too warm and the voltage on the capacitor too high, for which reason a comparatively expensive ground capacitor is necessary for continuous operation. Costs for known electrical starting aids in an unfavorable case can reach up to half the price of the single phase induction motor without the starting aid; it therefore presents a considerable portion of the total costs.

In single phase induction motors, the relatively low starting moment is furthermore disadvantageous. It can only be increased via expensive measures, each of these measures resulting in the nominal current being clearly exceeded. The nominal current therefore must be clearly reduced by some amount below this. This in fact would have to be done with the particular electrical power network with which it is to be used. This especially plays a part in the use of a single phase induction motor in high pressure cleaning devices which require an increased starting moment.

After a longer shutdown, the pump piston can stick; this results in an increased starting moment.

Finally, in the known electrical starting aids, it is problematic that their efficiency is dependent on the circumstances of the respective electrical power network. For example, this leads to the starting moment of a single phase induction motor for use in a country having a 220 V electrical power network and provided with an electrical starting aid being clearly reduced for operation in the U.S. where a 110 V electrical power network exists. This results in the fact that the electrical starting aids of single phase induction motors must be significantly modified for export from one country to another.

SUMMARY OF THE INVENTION

Thus, a primary object of the present invention is to provide single phase induction motor with a starting aid which eliminates the aforementioned problems.

This object and others are achieved in a single-phase induction drive motor for a high pressure cleaning device having a stator, a drive shaft, a high pressure pump driven by the drive shaft, a rotor located on the drive shaft and a manually operated starting aid, and wherein an on-off switch of the single phase induction motor is activated via the starting aid. Alternatively, the on-off switch can be activated independently of the starting aid, being reset after a predetermined time period depending on activation of starting aid.

According to the invention, it has been determined that expensive electrical starting aids which are subject to problems can be entirely or at least partially abandoned if there is a starting aid which can be operated by muscle power. With one such starting aid, which can be manually operated, the necessary starting moment for high pressure cleaning devices can be easily guaranteed. Moreover, there are no country-specific problems with starting aids which are operated by muscle power. When the on-off switch of the single phase induction motor is activated via the starting aid, it is ensured that power feed to the single phase induction motor takes place only when the rotor has reached a predetermined rpm. A version in which the on-off switch is activated upon stopping of the starting aid is especially suitable. Generally, the rotor at this time has its highest rpm so that then starting of the single phase induction motor is easily ensured.

Alternatively, it is also possible that the on-off switch is activated independently of the starting aid and after a reset after a preset time interval has elapsed depending on the activation of the starting aid. This measure can be especially easily implemented, overloading of the single phase induction motor being precluded by the fact that the on-off switch is reset when the starting aid has not been actuated within a predetermined time period or the single-phase induction motor has not started within this time interval.

One especially advantageous embodiment of the starting aid is one that is formed as a rope pull starter as is common, for example, lawn mowers that are gasoline motor driven. These rope pull starters can be economically produced and easily operated.

In single-phase induction motors for applications in which the starting moment to be applied is very high, it is a good idea to design the starting aid as a kickstarter.

The cost is especially low when the starting aid is located directly on the rotor shaft. This arrangement represents the most economical version. It is especial effective in conjunction with the rope pull starter.

In single phase induction motors in applications which require an especially high starting moment, it is advantageous if the starting aid acts on the rotor shaft via a transmission. Then, a multiple of the torque applied on the starting aid acts on the rotor shaft.

The above described measures are complemented especially advantageously by the fact that, in addition to the starting aid which can be actuated by muscle force, them is an electrical starting aid. If, in this case, the required starting moment is so low that it can be applied using the electrical starting aid, use of the manually operated starting aid is unnecessary. If, on the other hand, the electrical starting aid cannot provide the required starting moment, the additional required moment can be manually applied by the operator via the starting aid.

These and further objects, features and advantages of the present invention will become apparent from the following description when taken in connection with the accompanying drawings which, for purposes of illustration only, show a single embodiment in accordance with the present invention.

DETAILED DESCRIPTION OF THE PREFERRED EMBODIMENT

Figure 1:
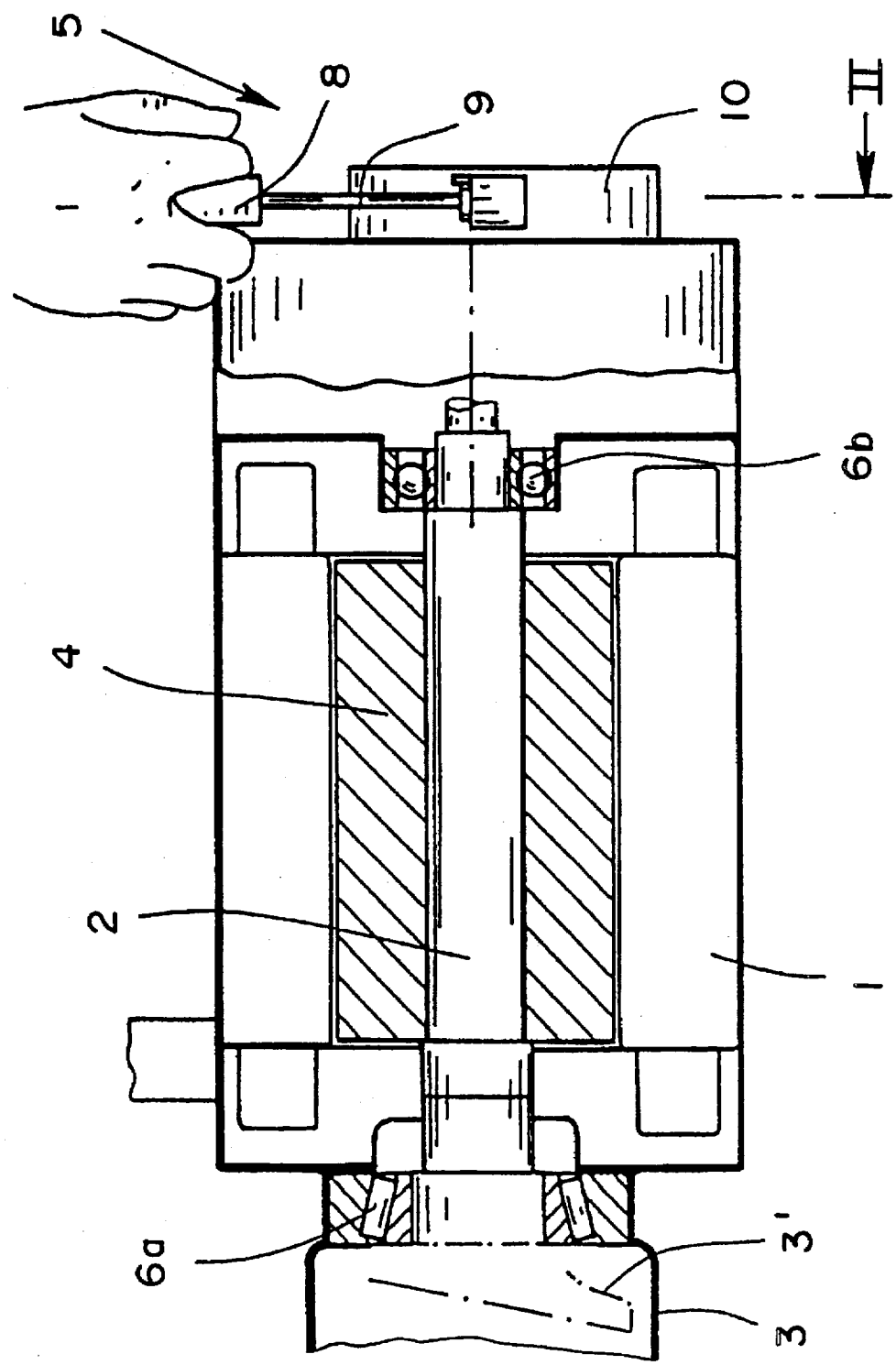
FIG. 1 shows a schematic partial cross section of one embodiment of a single-phase induction motor in accordance with the present invention.

FIG. 1 shows a single-phase induction motor having a stator 1 and a drive shaft 2 and which is used as the drive of a high pressure cleaning device having a high pressure pump 3 which is driven thereby (the pump being only diagrammatically shown here in the form of a swash plate pump with a swash plate 3 shown by broken lines). The motor also has a rotor 4 which is located on the drive shaft 2 and a starting aid 5 which can be operated by hand using muscle force to apply a torque as described below.

Figure 2:
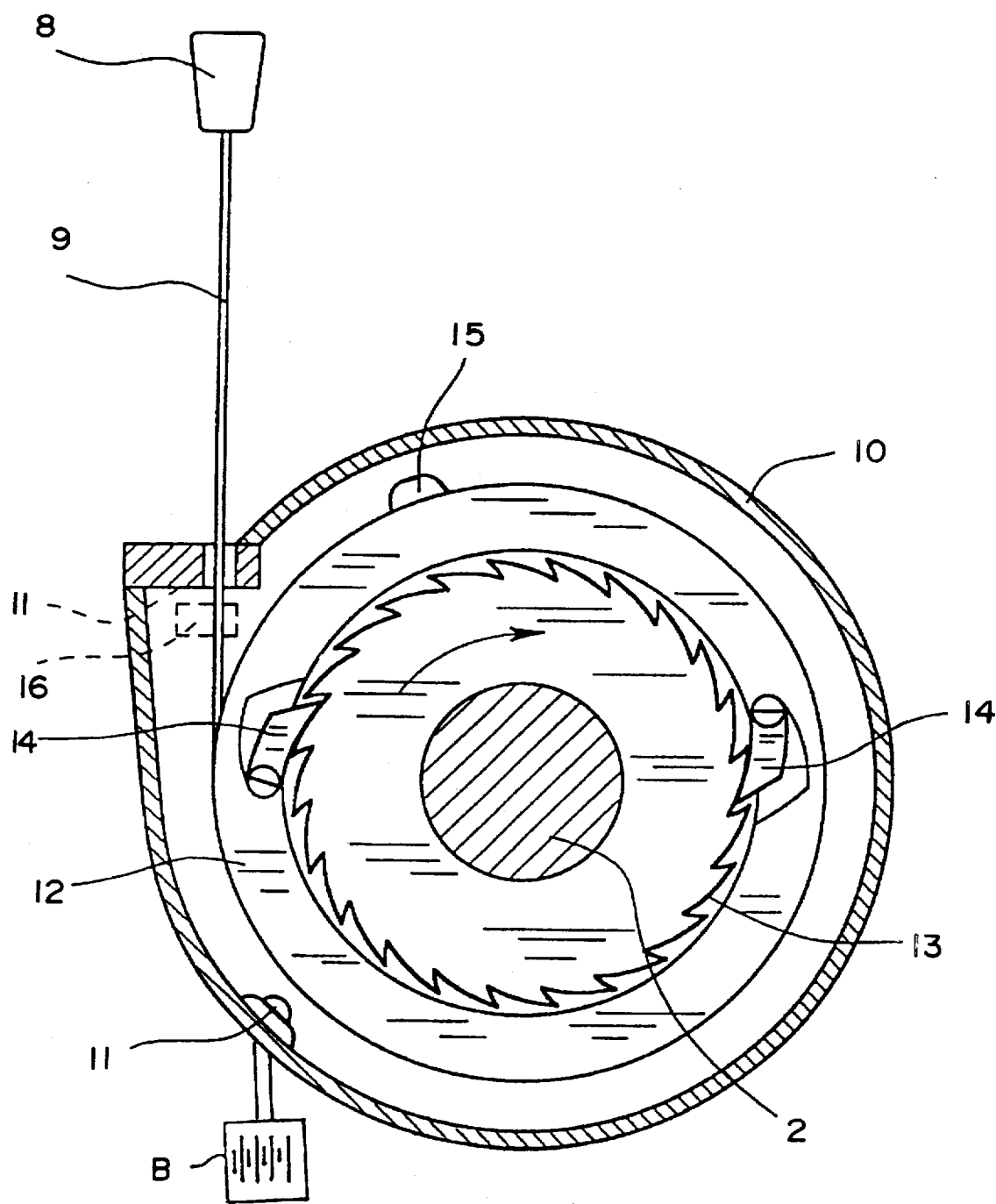
FIG. 2 is a transverse section taken along line 2—2 in FIG. 1 with the user s hand removed.

The drive shaft 2 is supported, in this case, via a tapered roller bearing 6a and a ball bearing 6b which are in a housing 7 which also holds the stator 1. FIG. 2 shows that an on-off switch 11 of the single-phase induction motor is activated via starting aid 5.

In particular FIGS. 1 and 2 show starting aid 5 being constructed as a rope pull starter. The rope pull starter 5 is located directly on the shaft 2 and has a handle 8, rope 9 and rope roller 12 which is located on cable pull starter 5. Rope roller 12, as shown in FIG. 2, has a free-wheel. In this embodiment, the free-wheel is formed as a combination of gear ring 13, permanently joined to shaft 2, and two catches which can swing inward, permanently joined to cord roller 12 and spring-loaded radially inward. A return spring (not shown) always returns cord roller 12 to an initial position, so that rope 9 of the rope pull starter 5 is rolled onto cord roller 12 when not in use.

In the embodiment, as shown in FIG. 2, a control cam 15 is provided on the periphery of cord roller 12, and the control cam 15 interacts with on-off switch 11, which is located in the vicinity of the through opening formed in housing 10 for passage of the rope 9, a point which will come into alignment with the rope roller 12 when it turns about 270°. The on-off switch 11 is activated by the control cam 15 as it is turned passed it.

In this embodiment, therefore, the operator pulls on handle 8, and thus, via rope 9 and rope roller 12, the shaft 2 of the single-phase induction motor is caused to rotate after the starting moment has been overcome. When control cam 15 reaches on-off switch 11, on-off switch 11 is activated, so that power supply to the single-phase induction motor is established and the single-phase induction motor begins to operate, driving, for example pump 3 of the high pressure cleaning device, via shaft 2.

As shown by the broken line in FIG. 2, the on-off switch 11 can also sit directly on the passage through housing 10 for rope 9. Then, for example, a stop 16 can be fixed on cable 9. If cable 9 is drawn out of the housing 10 as far as stop 16, the stop 16 will contact the on-off switch 11, thereby activating it so that the induction motor starts.

Free-wheel 13, 14 is deactivated when the induction motor is running; therefore, when the shaft 2 is turning independently in the direction of the arrow in FIG. 2, and rope roller 12 is stationary, the catches 14 running without resistance over the teeth of gear ring 13. Of course, other types of transmissions can be used, for example, a centrifugal clutch of conventional design.

Figure 3:
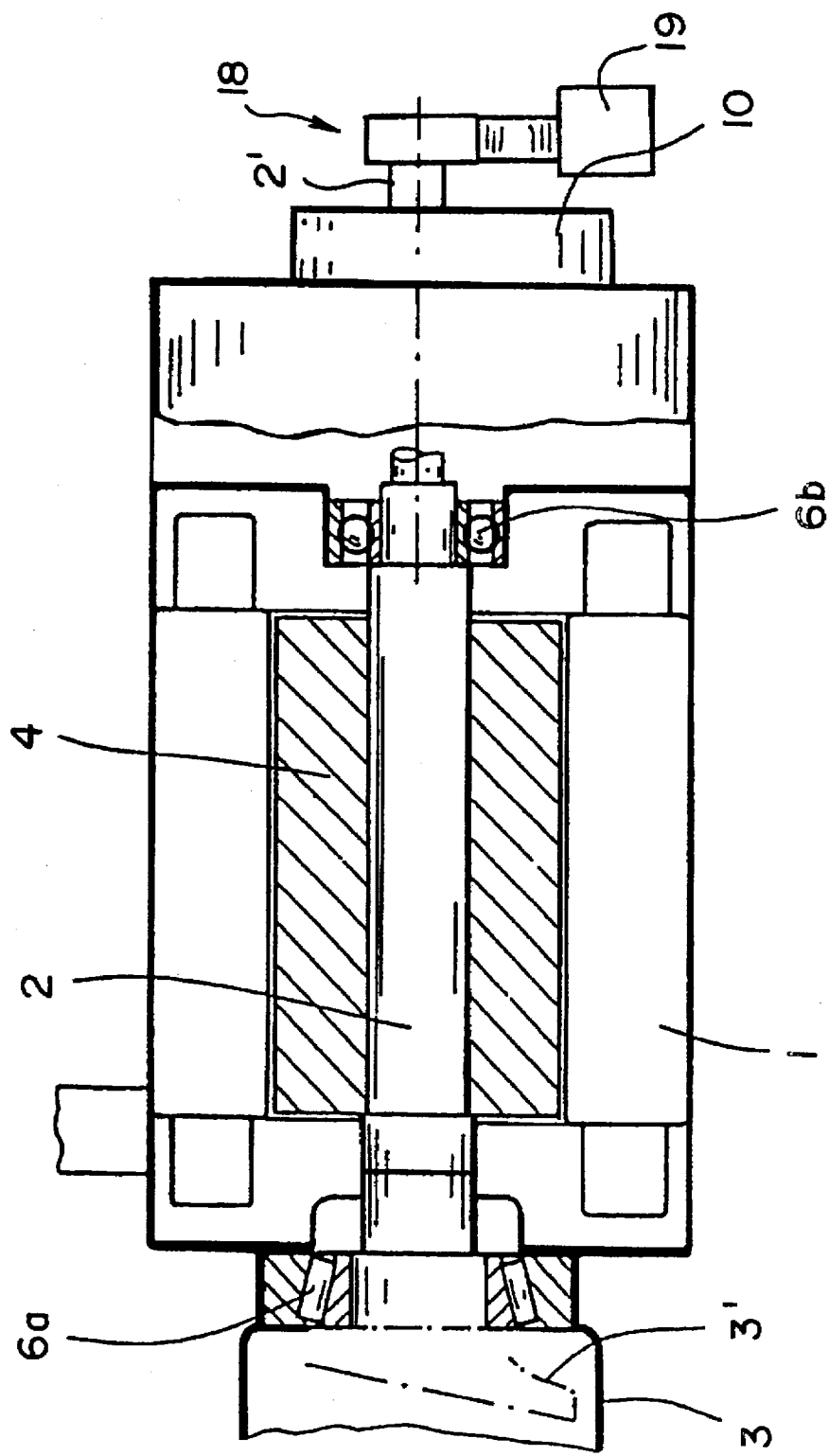
FIG. 3 is a view corresponding to that of FIG. 1, but showing an embodiment with a kickstarter instead of a rope pull starter.

In single-phase induction motors for applications in which the starting moment to be applied is very high, it is a good idea to design the starting aid as a kickstarter. FIG. 3 shows such an embodiment where a kickstarter 18 is provided in place of the rope pull 5 as the starting aid. In this case, a kickstarting pedal crank 19 is attached to an outwardly projecting end 2 of the shaft 2 for driving the free wheel 13, 14 in place of the rope pulley 12. Otherwise, the operation and construction remain as described above, and of course, kickstarters for motors being well known, for example, for motorcycles, any conventional kickstarting mechanism can be used to provide an initial starting impetus.

The above described measures be advantageously complemented by providing an electrical starting aid in addition to the starting aid which can be actuated by muscle force. If, in this case, the required starting moment is so low that it can be applied using the electrical starting aid, use of the manually operated starting aid is unnecessary. If, on the other hand, the electrical starting aid cannot provide the required starting moment, the additional required moment can be manually applied by the operator via the starting aid. In FIG. 2, such a supplemental electrical starting aid is diagrammatically represented by battery B.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. High pressure cleaning device with a single phase induction motor as a means for driving of the high pressure cleaning device, comprising a stator with a drive shaft, a high pressure pump driven by said drive shaft, a rotor which is located on the drive shaft, a muscle-powered starting aid, and wherein the starting aid is a rope pull starter.

2. High pressure cleaning device according to claim 1, wherein the starting aid is located directly on the drive shaft.

3. High pressure cleaning device according to claim 1, wherein the starting aid acts on the drive shaft via a transmission.

4. High pressure cleaning device according to claim 1, wherein means for activating the on-off switch when the starting aid stops is provided.

5. High pressure cleaning device according to claim 4, wherein the rope pull starter has a pull rope wound on a rope pulley; and wherein said means for activating is a rope stop arranged to engage the on-off switch when the rope is fully unwound by manual pulling thereon.

6. High pressure cleaning device according to claim 1, wherein an on-off switch for controlling operation of the single phase induction motor is provided, said on-off switch being activated by the starting aid.

* * * * *